United States Patent [19]

Lehmann

[11] 4,124,349
[45] Nov. 7, 1978

[54] ROLLING MILL WITH TWO PRESS GAPS

[75] Inventor: Rolf Lehmann, Rudolfstetten, Switzerland

[73] Assignee: Escher Wyss Limited, Zurich, Switzerland

[21] Appl. No.: 854,345

[22] Filed: Nov. 23, 1977

[30] Foreign Application Priority Data

Nov. 30, 1976 [CH] Switzerland .............. 015031/76

[51] Int. Cl.$^2$ .......................... B29D 7/14; D21F 3/00
[52] U.S. Cl. ................................. 425/367; 425/363; 29/116 AD
[58] Field of Search .................... 425/367, 363

[56] References Cited

U.S. PATENT DOCUMENTS

| | | | |
|---|---|---|---|
| 2,971,218 | 2/1961 | Bierer | 425/367 X |
| 3,077,222 | 2/1963 | Shanley | 425/363 X |
| 3,241,182 | 3/1966 | Kessler | 425/367 X |
| 3,246,365 | 4/1966 | Kloender | 425/367 |
| 3,570,052 | 3/1971 | Reade | 425/363 X |
| 3,581,340 | 6/1971 | Thieme | 425/363 X |
| 3,618,190 | 11/1971 | Vernazza et al. | 29/116 AD |
| 3,802,044 | 4/1974 | Spillmann et al. | 29/113 AD |
| 3,921,514 | 11/1975 | Biondetti | 29/116 AD X |
| 3,990,935 | 11/1976 | Lehmann | 29/116 AD X |
| 3,997,952 | 12/1976 | Lehmann et al. | 29/115 |
| 4,011,034 | 3/1977 | Curry et al. | 425/363 X |

Primary Examiner—J. Howard Flint, Jr.
Attorney, Agent, or Firm—Robert A. Ostmann

[57] ABSTRACT

Rolling mill for the pressure treatment of a web of material having two press gaps in each of which a different application pressure can be adjusted independently of the other gap. The two press gaps are formed between three rolls whose axes are situated parallel to one another and lie in two planes. The roll which adjoins the two other counter-rolls to form the press gaps is constructed as a pressure equalization roll with a stationary axial supporting member about which a shell is capable of rotating and in which hydrostatic supporting elements are arranged in rows extending parallel to the press gaps. The application pressure in the press gaps is produced exclusively by means of the hydrostatic supporting elements. The shell of the pressure roll shell is capable of moving in all radial directions relatively to the supporting member. The two counter-rolls are guided radially and axially.

9 Claims, 2 Drawing Figures

ROLLING MILL WITH TWO PRESS GAPS

BACKGROUND OF THE INVENTION

The invention relates to a rolling mill for the pressure treatment of a web of material. The mill has two press gaps in each of which a different application pressure can be adjusted independently of the other gap in each case.

In the pressure treatment of a web of material, for example a web of paper or textile material, the web of material must be treated with the same pressure over its entire width at all regions of a press gap. For this purpose, so-called pressure equalization rolls are used in a rolling mill. To form the two press gaps, in each of which a different application pressure can be adjusted independently of the other, at least two pairs of rolls are provided in which all four rolls are pressure equalisation rolls. Three-high mills for forming two press gaps independent of one another are also known, in which case the axes of the pressure rolls are situated either in a single plane or two planes parallel to one another. In the case of these three-high mills also all rolls are pressure equalization rolls in order to obtain equal pressure at all regions of the press gap. In these rolling mills, the web of material is treated in a completely satisfactory manner, but these rolling mills are complicated in construction and correspondingly expensive.

SUMMARY OF THE INVENTION

The invention is intended to provide a rolling mill of the type initially described which is substantially simpler and cheaper than hitherto known constructions.

This object is achieved according to the present invention in that the two press gaps are formed between three rolls whose axes are situated parallel to one another and lie in two planes, that furthermore the roll which adjoins the two other counter-rolls to form the press gaps is constructed as a pressure equalization roll with a stationary axial supporting member about which a shell can rotate and in which hydrostatic supporting elements are arranged in rows extending parallel to the press gaps, and that the application pressure in the press gaps is produced exclusively by means of the hydrostatic supporting elements by way of the shell of the pressure roll, the said shell being capable of moving in all radial directions relatively to the supporting member of the pressure roll, and the two counter-rolls are guided radially and axially.

Thus, the rolling mill comprises only a single pressure equalization roll and is thus simpler and cheaper. The shell of the pressure equalization roll is radially guided only by means of the counter-rolls and the supporting elements, and under the pressure of the supporting elements adapts itself in shape to the particular deflection of the counter-rolls, so that the web of material being treated is treated in all regions with the same pressure in each press gap.

This adaptation of the shell of the pressure roll to the counter-rolls when they bend requires a certain amount of force. Therefore it is advantageous if the shell of the pressure roll is constructed as a thin steel tube and is thereby given elasticity, or if the shell of the pressure roll is made at least partly of an elastomeric material so that it is made elastic in this way.

To simplify the rolling mill it is useful if at least one hydrostatic pressure element is provided in the supporting member of the pressure roll, for lifting the shell of the pressure roll away from the counter-rolls.

An advantageous constructional form is also obtained if the pressure roll with the supporting elements arranged in the supporting member is arranged in the space below the two counter-rolls, and that measures are taken for lowering the shell of the pressure roll away from the counter-rolls by shutting off the pressure in the hydrostatic supporting elements.

BRIEF DESCRIPTION OF THE DRAWING

The subject of the invention will be explained in detail hereinafter with reference to drawings wherein.

Figure 1:
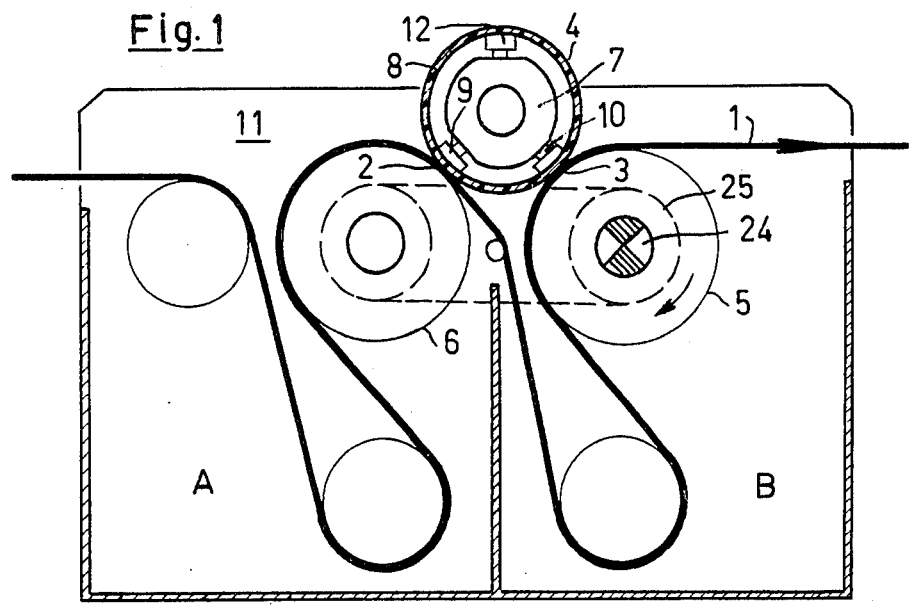
FIG. 1 shows a first constructional example.

Both examples are shown in a simplified manner in a partial cross-sectional view.

DESCRIPTION OF THE PREFERED EMBODIMENTS

The rolling mill illustrated is intended for the pressure treatment of a web of material, namely a web of textile material 1 which is guided through two different baths A and B. The liquid taken up by the web of material on passing through the bath in each case is pressed out of the web after passing through the particular bath in the two press gaps 2 and 3 of the rolling mill. In the press gap 2 it is possible to adjust a different application pressure from the pressure which occurs in the second press gap 3, independently of one another.

The two press gaps 2 and 3 are formed between three rolls 4, 5 and 6. The axes of these rolls 4, 5 and 6 extend horizontally in space, that is to say parallel to one another, and are situated in two planes. The axes of the rolls 5 and 6 are situated in a first plane and the axis of roll 4 is situated in a second plane. The roll 4, which adjoins the two other counter-rolls 5 and 6 for forming a press gap 2 — between the roll 4 and the counter-roll 6 — and the other press gap 3 — between the roll 4 and the counter-roll 5 — is constructed as a pressure equalization roll.

This pressure roll 4 comprises a stationary supporting member 7 about which a shell 8 is arranged so as to be capable of rotating. In the supporting member 7, hydrostatic supporting elements 9 and 10 are arranged. The supporting elements 9 are arranged in a row which extends along the press gap 2, between the shell 8 of the pressure roll 4 and the counter-roll 6, over the entire width of the web of material 1. The supporting elements 10 are arranged in another row which extends along the press gap 3 between the shell 8 of the pressure roll 4 and the counter-roll 5 over the entire width of the web of material 1. The hydrostatic supporting elements 9 and the hydrostatic supporting elements 10 are in each case connected to a separate hydraulic pressure conduit system so that it is possible to operate the supporting elements 9 with a different pressure from the supporting elements 10. Thus it is possible to set a different application pressure in the press gap 2 from the pressure which occurs in the press gap 3.

The shafts of the counter-rolls 5 and 6 and the supporting member 7 of the pressure roll 4 are mounted in a wall 11. A similar wall which is not shown in the drawings supports the shafts and the supporting member at their other end and in this manner they are guided radially and axially.

The shell 8 of the pressure roll 4 is mobile in all radial directions relatively to the supporting member 7 and is guided radially only between the press gaps 2 and 3 and the supporting elements 9 and 10. The counter-rolls 5 and 6 are guided radially and axially by means of bearing arrangements at their shafts. The counter-rolls 5 and 6 are supported rotatably by means of their bearing arrangements in the wall 11 and in the opposite matching wall not shown in the drawings. The application pressure in the two press gaps 2 and 3 is produced only by means of the hydrostatic supporting elements 9 and 10, which press the shell 8 of the pressure roll 4 in each case against the counter-roll 6 and against the counter-roll 5 respectively.

The counter-rolls 5 and 6 are both integral rolls, that is to say their shell in each case is supported on the roll shaft which rotates with the shell. These counter-rolls 5 and 6 accept the application pressure which is exerted by the hydrostatic supporting elements 9 and 10 supported in the supporting member 7 of the pressure roll 4, and are subjected to deflection during operation. Under the pressure of the hydrostatic supporting elements 9 and 10, however, the shell 8 adapts itself to the deflection of the counter-rolls 5 and 6, so that the press gaps 2 and 3 between the pressure roll 4 and the counter-rolls 5 and 6 have the same clearance in each case over the entire width of the web of material 1 being treated, and the web of material is treated over its entire width with an equal pressure in the press gap in question. To adapt the shell 8 of the pressure roll 4 to the deflection of the counter-rolls 5 and 6, a certain amount of force has to be used at the hydrostatic supporting elements 9 and 10. Therefore, it is advantageous if the shell 8 of the pressure roll 4 is capable of being easily deformed. Therefore, in the constructional example the shell 8 is constructed from an elastomeric material and is readily easily deformed since it is elastic in its behaviour. For the same reason the shell 8 could also be made for example from a thin deformable steel tube.

The shell 8 of the pressure roll 4 can be lifted away from the counter-rolls 5 and 6. For this purpose there is arranged in the supporting member 7 of the pressure roll 4 at least one hydrostatic pressure element 12, connected to a pressure conduit not shown here. The pressure element 12 is arranged in such a manner in the supoorting member 7 that when it is subjected to pressure it lifts the shell 8 away from the counter-rolls 5 and 6. If the pressure in the hydrostatic supporting elements 9 and 10 is shut off at the same time, it is then possible to lift the shell 8 so that the clearance of the press gaps 2 and 3 is increased.

Figure 2:
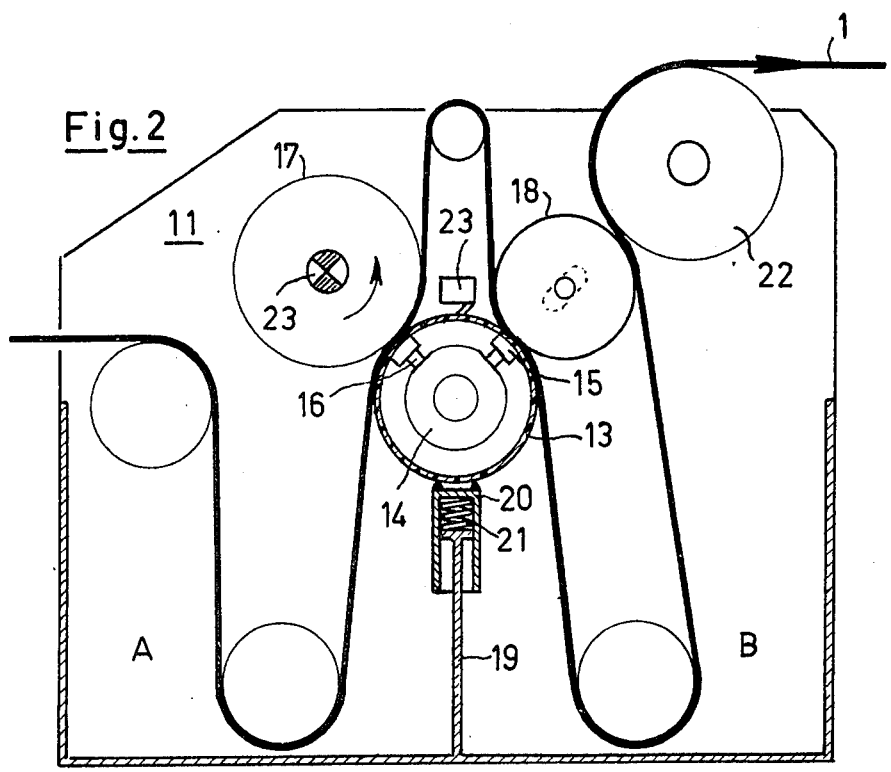
FIG. 2 shows a second contructional example of a rolling mill.

As FIG. 2 shows, a rolling mill according to a second constructional example comprises a pressure roll 13 with hydrostatic supporting elements 15 and 16 which are situated in a stationary axial supporting member 14 and which are arranged in space below the two counter-rolls 17 and 18. Situated below the pressure roll 13 between baths A and B is a wall 19. Provided between the top edge of this wall 19 and the pressure roll is a stripping-off device 20 which contacts the shell of the pressure roll 13 and strips off the liquid adhering to the shell. This device 20 is supported by means of a spring 21 on the top edge of the wall 19 and is pressed against the shell of the pressure roll 13. Instead of the spring 21, the stripping-off device 20 could be supported for example by means of hydraulically operated pressure elements. When the pressure in the supporting elements 15 and 16 is shut off, the shell of the pressure roll 13 descends because of its own weight downwards away from the counter-rolls 17 and 18. The spring 21 is dimensioned in such a manner that when the shell of the pressure roll 13 moves downwards the stripping-off device 20 is pushed downwards.

The counter-roll 18 is arranged between the pressure roll 13 and a supporting roll 22. The application pressure which is produced by the supporting elements 15 is accepted in the first instance by the bearing arrangement of the supporting roll 22. This arrangement of the rolls of the rolling mill makes it possible to have a two-fold successive different pressure treatment of the web of material 1 after it passes through the first bath A. 23 is a device for diverting the liquid adhering to the shell of the pressure roll 13 before the shell has reached the second press gap at the supporting elements 15. Between the rolls 18 and 22 is a press gap in which the web of material 1 is treated after it passes through the second bath B.

In the rolling mill in FIG. 2, one of the counter-rolls, namely the counter-roll 17, is driven by means of its shaft 23.

In the rolling mill shown in FIG. 1, one of the counter-rolls, the counter-roll 5, is driven by way of its shaft 24. The counter-roll 5 is connected to the second counter-roll 6 by way of a gearing 25 which is shown in broken lines in the drawing. The two counter-rolls 5 and 6 are thus synchronized.

It may additionally be advantageous to construct the pressure roll 4 in FIG. 1 or the pressure roll 13 in FIG. 2 in such a manner that for example the supporting elements 9 and 10 which are arranged in the supporting member 7 of the pressure roll 4 in rows along the press gap 2 and the press gap 3 respectively, are arranged in zones. The individual supporting elements associated in each case with one of the zones are connected to a separate pressure conduit which is taken through the supporting member. In this way it is possible to adjust a different pressure in the individual zones, for example to adjust a larger pressure in the middle of the shell 8 than at the ends of the shell, so as to obtain exactly the same clear width of press gap over the entire width of the web of material 1. For example if long counter-rolls are subjected to such deflection during operation of the rolling mill that an additional force has to be provided to adapt the shell to such deflection. These zones can advantageously be dimensioned differently along the first or the second press gap.

For example it is possible to arrange the supporting elements 9 in two zones along the press gap 2, and the supporting elements 13 can be arranged in three zones along the press gap 3.

Since the zones in each case are connected to a separate pressure conduit, the application pressure can be adjusted differently in the individual press gaps, independently of one another, and precisely identically along the individual press gap.

Since it is already known per se in pressure equalisation rolls, this measure which has just been described does not need to be shown in the drawings.

I claim:

1. Rolling mill for the pressure treatment of a web of material and having two press gaps in which independently adjusted application pressures can be developed, the mill comprising a. a pressure equalization roll including a stationary axial supporting member having a horizontal axis, hydrostatic supporting elements which are mounted in the supporting member and are arranged in rows which extend along the press gaps, and a shell which rotates about the supporting member and is supported thereon via the hydrostatic supporting elements, the shell being capable of moving in all radial directions relatively to the supporting member; and b. two counter-rolls of the integral type having axes which lie in a common horizontal plane spaced vertically from the axis of the equalization roll, and which coact with the shell of the equalization roll to define the two press gaps, c. the application pressure in each press gap being produced exclusively by the associated row of hydrostatic supporting elements of the pressure equalization roll.

2. Rolling mill according to claim 1, in which the shell of the pressure equalization roll is constructed as a thin steel tube and is thereby elastic.

3. Rolling mill according to claim 1, in which the shell of the pressure equalization roll is made at least partly of an elastomeric material and is thereby made elastic.

4. Rolling mill according to claim 1, in which one of the counter-rolls is driven.

5. Rolling mill according to claim 1, in which one of the counter-rolls is driven and is connected to the second counter-roll by way of a gearing.

6. Rolling mill according to claim 1, in which the supporting elements arranged in rows at the supporting member are arranged in each case in zones along the respective press gap and in these zones the associated supporting elements can be hydraulically operated differently from the other zones, the arrangement of the zones along one press gap being different from the arrangement of the zones along the other press gap.

7. Rolling mill according to claim 1, in which
a. the horizontal plane containing the axes of the counter-rolls is located below the axis of the equalization roll, and said rows of hydrostatic supporting elements are located in lower regions of the axial supporting member; and
b. the equalization roll includes at least one additional hydrostatic supporting element which is mounted in an upper region of the axial supporting member,
c. whereby, when pressure is applied to said additional supporting element and shut off from the supporting elements in said rows, the additional supporting element lifts the shell and increases the clearances at said press gaps.

8. Rolling mill according to claim 1, in which
a. the horizontal plane containing the axes of the counter-rolls is located above the axis of the equalization roll, and said rows of hydrostatic supporting elements are located in upper regions of the axial supporting member,
b. whereby, when pressure is shut off from the supporting elements, the shell descends of its own weight and increases the clearances at said press gaps.

9. Rolling mill according to claim 1, in which
a. one of the counter-rolls is provided with a support roll located diametrically opposite the equalization roll and with which the counter-roll forms a third press gap; and
b. said one counter-roll is movable toward the support roll by the hydrostatic supporting elements in one of said rows,
c. whereby said one row of supporting elements also produces the application pressure in the third press gap.

* * * * *